April 1, 1924.  
O. E. DUNHAM  
CONTAINER FOR FOOD PRODUCTS  
Filed March 24, 1923

1,488,634

Inventor

Otis Emerson Dunham

By [signature]

Attorney

Patented Apr. 1, 1924.

1,488,634

UNITED STATES PATENT OFFICE.

OTIS EMERSON DUNHAM, OF BEVERLY, MASSACHUSETTS.

CONTAINER FOR FOOD PRODUCTS.

Application filed March 24, 1923. Serial No. 627,482.

*To all whom it may concern:*

Be it known that I, OTIS EMERSON DUNHAM, residing at Beverly, in the county of Essex, State of Massachusetts (post-office address % Page & Shaw, Inc., Cambridge, Mass.), a citizen of the United States, have invented certain new and useful Improvements in Containers for Food Products, of which the following is a specification.

The object of my invention is to provide a unique box or vial, particularly adapted for use in connection with food products, such as candy, chocolate, nuts, fruits, biscuits, etc., and which presents the desirable qualities or characteristics of maximum transparency, thinness, and lightness in weight, of insolubility, of non-brittleness and non-susceptibility to atmospheric changes, and of high lustre or polish.

A highly transparent box or vial for food products, such as candy, is desirable; but, to be entirely practical, it should present all the characteristics enumerated above. As an illustration, a transparent carton, such as a vial or cylindrical box, containing hard candy, of bright, contrasting colors, presents an attractive novelty, which finds a ready market. The commercial world has made various attempts to place before the public such a novelty package. For instance, waxed paper bags, containing various food products, have been on sale for a long time; but, on account of the great flexibility of waxed paper, it is obviously unsuitable for anything but substantially flat containers. Again, gelatine boxes, vials, etc., have been proposed, and are in use for certain purposes; but they are readily susceptible to atmospheric changes, and are, also, brittle in cold weather, so that they are extremely fragile and are thus not perfectly adapted for the use to which the box or vial of my invention is intended.

My invention resides in the utilization of a highly transparent material, whose base is cellulose, preferably, a cellulose acetate or a non-camphor cellulose. The invention is also concerned with the problem of the best method of making up flat cellulose blanks into box or vial form. Other phases of the invention will appear as the specification proceeds.

The accompanying drawing discloses the invention embodied in a cylindrical box or vial. Briefly described:

Figure 1:
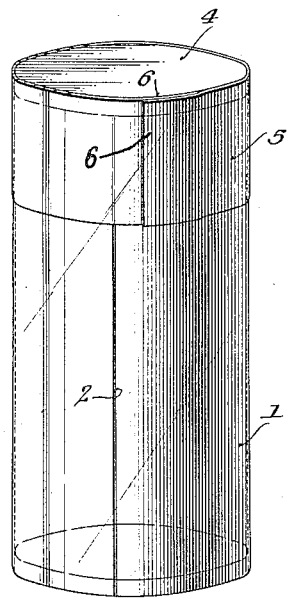
Figure 1 is a view in perspective of the vial constructed in accordance with my invention.
Figure 2:
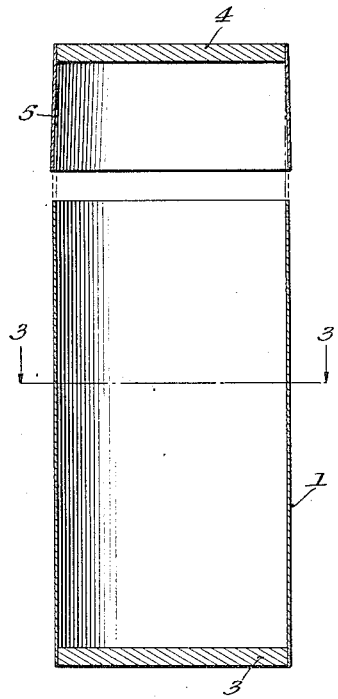
Figure 2 is a view in central longitudinal section thereof, with the cap or cover removed.
Figure 3:
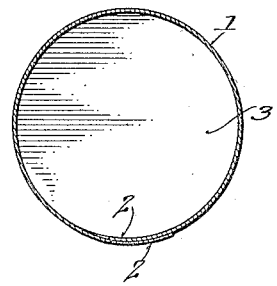
Figure 3 is a cross sectional view, taken on the plane of the section line 3—3, Fig. 2, looking in the direction of the arrows indicated thereon.

Referring, now, in detail, to the drawing, and, first, to Figs. 1 to 3 thereof:

The body portion of the cylindrical box or vial is made up from a single flat sheet of highly transparent material, the base of which is cellulose, preferably a cellulose acetate, or a non-camphor cellulose, and which material, as previously noted, possesses the charactertistics of high transparency, insolubility, non-brittleness, and non-susceptibility to atmospheric changes, and which is capable of being made into relatively thin sheets of no appreciable weight without sacrificing the requisite strength and durability for the purpose which I have in view. Sheets made of this material are capable of being printed in colours and highly embossed, which adds greatly to the value of such material for commercial use, when made up into vials, or the like, for the reception and display of merchandise. Such cellulose material, also, is susceptible of being made in any desired colour, thus making it possible to provide containers embodying a wide range of colors.

In translating a flat sheet of such material into tubular form, a cylindrical mandrel or former may conveniently be used, around which the operator bends the sheet to form the tubular body portion 1 of the cylindrical box or vial. The overlapping ends of the cylindrically-bent sheet are then suitably secured together, preferably by an appropriate adhesive. For this purpose, the operator preferably applies adhesive along one longitudinal edge of the sheet, before folding the latter around the mandrel. The most advantageous adhesive which I have found, for use in connection with my cellulose sheets, is glacial acetic acid (99% pure), to which has been added ten drops of formic acid (85% pure) for each ounce of acetic acid. By the use of such an adhesive, the overlapping portions 2, 2 of the body portion 1 are firmly united, against accidental or unpremeditated separation, and the use of such adhesive is unobjectionable from the standpoint of the production of a sanitary container.

For the production of a cylindrical box or vial of a maximum capacity of four ounces, sheets of this cellulose material having a thickness of only .005 of an inch may be used.

The bottom of the cylindrical box may be closed by a disk 3, which, from the standpoint of cheapness, may be of cardboard of suitable thickness for the purpose, but which may be of the same material as the body portion 1. If the disk be of the cellulose material mentioned, then it should be of suitable thickness to afford the requisite peripheral area for the application of the adhesive thereto, and, consequently, in most cases, would be of greater thickness than the sheet used to form the body portion 1.

Besides being cheaper, cardboard disks lend a certain degree of rigidity and stability to the container, which is not presented by disks constructed of the particular cellulose material hereinbefore mentioned, unless such transparent disks be made of considerable thickness.

Figure 4:
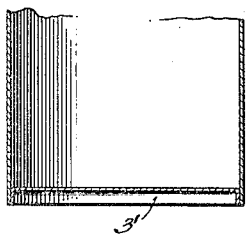
Figure 4 is a fragmentary sectional view of a vial provided with a slightly modified form of disk.

If desired, the disk, whether of paper or of the particular cellulose material mentioned, may be provided with a peripheral flange 3', as shown in Fig. 4, and the adhesive applied between this flange and the adjacent portion of the inner surface of the tubular body portion 1.

The cylindrical box is provided, at its top, with a suitable slip-closure, preferably comprising a disk 4 and a pendent sleeve or skirt 5. In constructing this slip-closure, it is convenient to use a cylindrical mandrel or former, of suitable diameter, preferably tapering toward one end thereof. The operator folds a flat strip of the particular cellulose material hereinbefore described into tubular form, around this mandrel, adhesive (preferably of the nature previously described) having previously been applied along one end of the strip. A tubular body, with overlapping, adhesively secured ends 6, 6, is thereby formed, which is slightly tapering toward one end thereof, as clearly shown in Fig. 2. As this tubular body or skirt 5 is of a size such that the end having the larger diameter makes a snug frictional fit with the body portion 1, when the skirt is slipped thereover, it will be seen that the tapering construction of the skirt has the effect of very closely confining or constricting the extreme top of the box or vial, when the skirt is pushed fully onto the body portion 1, which materially lessens liability of accidental displacement or removal of the slip-closure, in use. The disk 4 is of the same material, preferably, as the disk 3, and is adhesively secured to the skirt portion 5, at one end thereof. By reason of the taper of the skirt portion 5, as described, it is possible to use disks 3 and 4 of the same diameter, thus economizing in the cost of construction.

If desired, instead of using the disk 4, the form of disk shown in Fig. 4, having the peripheral flange 3', may be used; but this is not recommended, as the form of disk shown in Fig. 4 is relatively more expensive to make.

The cellulose material, of the particular nature herein mentioned, is unobjectionable, from a sanitary and hygienic standpoint, for use in making food containers, being absolutely harmless to food products, as is evidenced by an official report from the food chemist of the United States Department of Agriculture, to whom one of my specimen containers has been submitted.

A food container to be used in interstate commerce must have qualities which permit its use in varying climates and atmospheric conditions present in widely separated portions of the United States. Thus, a gelatine container, which might be suitable in New England, would not be suitable in the Southwest. Transparent materials, as customarily used for food containers, which will answer for use in a temperate atmosphere, will not be suitable in either a very cold or a very hot temperature. The material used by me, as described, for my containers has been subjected to live steam, and also to very cold air, without apparently affecting it.

Having thus fully described my invention, it will be seen that I have provided a food-container, having the attributes particularly described, which has a transparent cylindrical body portion 1 and opaque top and bottom 4 and 3, respectively, or which is entirely transparent by utilizing disks (constituting top and bottom, 4 and 3 respectively) constructed of the same transparent material of which the body-portion 1 is made.

What I claim as new and desire to secure by Letters-Patent of the United States is:

1. A food container, composed of a material having the characteristics of extreme transparency, non-brittleness, and non-susceptibility to atmospheric changes, and having a tubular body portion; a slip-closure for the top of said body portion and comprising a tubular, tapered sleeve adapted to be slipped on said body portion and to constrict the same toward one end thereof, and a disk adhesively secured to said sleeve at one end thereof; and a disk adhesively secured at the lower end of said body portion.

2. A food container, composed of a material having the characteristics of extreme transparency, non-brittleness, and non-susceptibility to atmospheric changes, and having a tubular body portion; a slip-closure for the top of said body portion and comprising a tubular, tapered sleeve adapted to be slipped on said body portion and to constrict the same toward one end thereof, and a disk adhesively secured to said sleeve at one end thereof; and a disk adhesively secured at the lower end of said body portion; said disks being of the same diameter.

In testimony whereof I hereunto affix my signature.

OTIS EMERSON DUNHAM.